US012466572B2

(12) United States Patent
Sheppard et al.

(10) Patent No.: US 12,466,572 B2
(45) Date of Patent: Nov. 11, 2025

(54) PROPULSION SYSTEM THERMAL MANAGEMENT

(71) Applicant: VERTICAL AEROSPACE GROUP LIMITED, Bristol (GB)

(72) Inventors: James Sheppard, Bristol (GB); Andrea De Matteis, Bristol (GB)

(73) Assignee: VERTICAL AEROSPACE GROUP LIMITED, Bristol (GB)

( * ) Notice: Subject to any disclaimer, the term of this patent is extended or adjusted under 35 U.S.C. 154(b) by 0 days.

(21) Appl. No.: 19/074,082

(22) Filed: Mar. 7, 2025

(65) Prior Publication Data
US 2025/0206456 A1 Jun. 26, 2025

Related U.S. Application Data

(63) Continuation of application No. 17/794,005, filed as application No. PCT/GB2021/050203 on Jan. 28, 2021, now Pat. No. 12,269,605.

(30) Foreign Application Priority Data

Jan. 29, 2020 (GB) ..................................... 2001220

(51) Int. Cl.
*B64D 33/10* (2006.01)
*B64C 29/00* (2006.01)
*B64D 27/355* (2024.01)

(52) U.S. Cl.
CPC .......... *B64D 33/10* (2013.01); *B64C 29/0025* (2013.01); *B64D 27/355* (2024.01)

(58) Field of Classification Search
CPC ........ B64D 33/08; B64D 33/10; B64U 20/90; B64U 20/94; B64U 20/96
See application file for complete search history.

(56) References Cited

U.S. PATENT DOCUMENTS 9,764,833 B1 9/2017 Tighe et al.
10,220,954 B2 3/2019 Sun et al.
(Continued)

FOREIGN PATENT DOCUMENTS

KR 100852423 B1 8/2008
KR 20100109717 A 10/2010

OTHER PUBLICATIONS

United Kingdom Combined Search and Examination Report dated Nov. 4, 2020, for United Kingdom Patent Application No. 2001220. 9.

(Continued)

*Primary Examiner* — Arfan Y. Sinaki
(74) *Attorney, Agent, or Firm* — EIP US LLP (57) ABSTRACT

A flying vehicle propulsion system comprises a propulsor, a drive system, a heat exchanger, and a housing in which the heat exchanger is provided. The propulsor produces a propulsor fluid flow. In a first operation configuration of the propulsion system, at least part of the propulsor fluid flow is incident on the exchanger. A propulsor fluid flow inlet port of the housing fluidly communicates with a chamber of the housing on an inlet side of the exchanger. The inlet port receives the propulsor fluid flow for ingestion into the chamber and exchanger and comprises a valve to close the port when the valve is closed and open the port when the valve is open. The valve is biased such that at least one of: the valve opens passively under a propulsor fluid flow rate influence above a pre-defined threshold impinging on the valve; and the valve closes passively under a biasing influence.

18 Claims, 2 Drawing Sheets

(56) References Cited

U.S. PATENT DOCUMENTS

| | | |
|---|---|---|
| 11,258,333 B2 * | 2/2022 | Cottrell ................ H02K 1/20 |
| 2018/0105268 A1 * | 4/2018 | Tighe .................. B64U 10/10 |
| 2022/0041275 A1 | 2/2022 | Tian |

OTHER PUBLICATIONS

International Search Report and Written Opinion dated Mar. 17, 2021 for International Patent Application No. PCT/GB2021/050203.

International Preliminary Report on Patentability dated Jul. 28, 2022 for International Patent Application No. PCT/GB2021/050203.

* cited by examiner

PROPULSION SYSTEM THERMAL MANAGEMENT

CROSS-REFERENCE TO RELATED APPLICATIONS

This application is a continuation under 35 U.S.C. § 120 of U.S. application Ser. No. 17/794,005, filed Jul. 20, 2022, which is a 371 National Phase application of International Application No. PCT/GB2021/050203, filed Jan. 28, 2021, which claims priority to United Kingdom Application No. GB 2001220.9, filed Jan. 29, 2020, under 35 U.S.C. § 119 (a). Each of the above-referenced patent applications is incorporated by reference in its entirety.

TECHNICAL FIELD

The present disclosure relates to propulsion system thermal management. More specifically but not exclusively the disclosure concerns providing thermal management of a propulsion system regardless of whether an associated flight vehicle is performing vertical flight or forward flight. Aspects of the disclosure relate to a flying vehicle propulsion system and a flying vehicle.

BACKGROUND

A drive system of a flying vehicle propulsion system will typically need thermal management (e.g. cooling) during use. Thermal management systems, (including for instance a fan and radiator) can thus be employed to perform the thermal management necessary. Nonetheless, such systems tend to be relatively heavy, consume energy reserves, increase complexity (with attendant failure modes) and add packaging constraints. These problems may be more acute in lighter/smaller flying vehicles (e.g. battery or fuel cell powered VTOL aircraft) which may have limited power and/or fuel reserves and limited space for equipment to be carried.

One option to significantly mitigate these difficulties is to use ram air generated by forward movement of the flying vehicle to provide thermal management. Nonetheless, particularly where the flying vehicle is a VTOL aircraft, there may be significant periods of high load operation where there is little or no ram air present that can be used for thermal management. In many cases it may prove difficult or impossible to size a ram air based cooling system with sufficient inertia to prevent overheating of the drive system where VTOL operation is envisaged.

SUMMARY OF THE INVENTION

According to a first aspect of the invention there is provided a flying vehicle propulsion system comprising a propulsor, a drive system and a heat exchanger, where the drive system is arranged to drive the propulsor and the heat exchanger is arranged to thermally regulate at least part of the drive system, the propulsor being arranged to move fluid, thereby producing a propulsor fluid flow having a main direction, and where the system is arranged such that in a first operation configuration, at least part of the propulsor fluid flow is incident on the heat exchanger, thereby thermally regulating the at least part of the drive system. In this way it may be possible to reduce or avoid altogether the provision of alternative thermal regulation for thermally regulating the drive system. This may increase efficiency (i.e. reducing/eliminating the need to use power generated by the drive system or another source to provide thermal regulation e.g. cooling). It may also reduce weight, complexity and packaging constraints by eliminating the need for or reducing the capacity required of a dedicated thermal regulation system.

In some embodiments the propulsor is arranged to propel the flying vehicle. It may for instance be the main propulsion of the flying vehicle or comprise an instance among a plurality of similar and/or alternately configured propulsors which together comprise the main propulsion of the flying vehicle.

In some embodiments the at least part of the propulsor fluid flow incident on the heat exchanger is travelling in the main direction.

In some embodiments the main direction is substantially perpendicular to a plane of rotor blades of the propulsor.

In some embodiments in a second operation configuration, the system is arranged such that a ram fluid flow produced by forward flight of the vehicle equipped with the system, is incident on the heat exchanger, thereby thermally regulating the at least part of the drive system. In this way, ram fluid flow produced by conventional flight may be used for thermal regulation in addition to or as an alternative to the propulsor fluid flow as appropriate in dependence on its availability/velocity. This may be advantageous as it may allow advantage to be taken of the ram fluid flow for thermal regulation when available and sufficient. At such times it may be that the propulsor fluid flow is reduced or not available (e.g. because it is desirable or necessary not to run the propulsor which generates the propulsor fluid flow at such times).

In some embodiments the main direction of propulsor fluid flow is different from a main direction of the ram fluid flow. This may occur for example where the propulsor is arranged to be have a substantially fixed mounting orientation with respect to a flying vehicle on which the flying vehicle propulsion system may be installed, and its fixed mounting orientation is such as to produce a main propulsor fluid flow direction different from the main direction of the ram fluid flow. This may allow for thermal regulation to continue, despite the fixed orientation mounting of the propulsor, even where different flight modes (e.g. vertical and horizontal) are performed. Further, the main direction of the propulsor fluid flow may be substantially perpendicular to the main direction of the ram fluid flow.

In some embodiments the main direction of propulsor fluid flow may be adjustable (e.g. where the rotor is a tilt-rotor) and may be substantially the same as the main direction of the ram fluid flow (to the extent that it is present) in one or more particular flight modes (e.g. taxiing, conventional take-off or forward flight). In such circumstances, the particular flight mode or modes may correspond to the second operation configuration of the flying vehicle propulsion system. In such circumstances, it may be ram fluid flow alone that is incident on the heat exchanger, where the flying vehicle propulsion system is arranged such that incidence of the propulsor fluid flow on the heat exchanger is avoided in these flight modes. Alternatively, a combination of the propulsor fluid flow and ram fluid flow may be incident on the heat exchanger (e.g. where the propulsor is upstream of the heat exchanger with respect to the main direction of the ram fluid flow and is in the flow path followed by the ram fluid flow incident on the heat exchanger). In any case, in one or more other particular flight modes (e.g. static, taxiing, vertical take-off, short take-off, vertical flight, vertical landing or rolling vertical landing), the main direction of the propulsor fluid flow and the main direction of the ram fluid flow may be different and may be substantially perpendicular.

In some embodiments the first operation configuration is a configuration in which the ram fluid flow is not present or has a velocity below a predetermined threshold. In such circumstances the propulsor fluid flow may compensate for the loss in thermal regulation contribution which might otherwise be offered by the ram fluid flow.

In some embodiments the propulsor is at least one of running down, deactivated, running up, or running below a predetermined threshold velocity in the second operation configuration. The drive system may also be in a similar condition. Deactivation of the propulsor, which may provide thrust in a direction substantially perpendicular to the main direction of the ram fluid flow, may be efficient during forward flight. Further such deactivation may be facilitated where the ram fluid flow is available for thermal regulation.

In some embodiments the first operation configuration is at least one of a static, taxiing, vertical take-off, short take-off, vertical flight, vertical landing or rolling vertical landing operation configuration. In such operation configurations there may be a lack of ram fluid flow and therefore a benefit in the propulsor fluid flow providing thermal regulation.

In some embodiments the second operation configuration is at least one of a taxiing, conventional take-off or forward flight operation configuration. In such operation configurations ram fluid flow may be present and so it may be efficient to use such ram fluid flow for thermal regulation.

In some embodiments the system comprises a housing in which the heat exchanger is provided. The housing may be a substantially fluid tight container with the exception of the various ports discussed further below. The housing may be substantially rectangular in cross-section. The housing may provide physical and/or aerodynamic shielding to components therein and/or may serve to assist in directing fluid flow (e.g. into the heat exchanger).

In some embodiments the housing comprises a propulsor fluid flow inlet port in fluid communication with a first chamber of the housing on an inlet side of the heat exchanger, the propulsor fluid flow inlet port being arranged to receive propulsor fluid flow for ingestion into the first chamber and heat exchanger. As will be appreciated, multiple propulsor fluid flow inlet ports may be provided and discussion in this document of any individual propulsor fluid flow inlet port may be considered to also apply to other propulsor fluid flow inlet ports mutatis mutandis. The propulsor fluid flow inlet port may comprise a simple aperture or apertures in a wall of the housing and/or ducting and/or a scoop serving to collect and/or direct propulsor fluid flow.

In some embodiments the propulsor fluid flow inlet port is provided on a wall of the housing facing the propulsor. Where the propulsor is a tilt-rotor, the propulsor fluid flow inlet port may be provided on a wall of the housing facing the propulsor in one or more particular flight modes. The propulsor fluid flow inlet port may be provided on a top wall of the housing and the propulsor may be provided above the top wall of the housing. This may permit efficient ingestion of propulsor fluid flow.

In some embodiments the propulsor fluid flow inlet port comprises a valve arranged to close the propulsor fluid flow inlet port when the valve is closed and open the propulsor fluid flow inlet port when the valve is open. The valve may be a cover in the form of a door or cowling. The valve may allow blocking of the propulsor fluid flow inlet port when, for example, it is desired that ram fluid flow rather than propulsor fluid flow should provide the thermal regulation. This may serve to substantially prevent the escape of ram fluid flow through the propulsor fluid flow inlet port where it is desired that such ram fluid flow should instead pass through the heat exchanger. This may for instance be in circumstances where there is sufficient ram fluid flow to provide the necessary thermal regulation.

In some embodiments the valve is arranged to be biased towards closed. The biasing may be created by spring loading.

In some embodiments the housing comprises a ram fluid flow inlet port in fluid communication with the first chamber of the housing on the inlet side of the heat exchanger, the ram fluid flow inlet port being arranged to receive ram fluid flow for ingestion into the first chamber and heat exchanger. As will be appreciated, multiple ram fluid flow inlet ports may be provided and discussion in this document of any individual ram fluid flow inlet port may be considered to also apply to other ram fluid flow inlet ports mutatis mutandis. The ram fluid flow inlet port may comprise a simple aperture or apertures in a wall of the housing and/or ducting and/or a scoop serving to collect and/or direct ram fluid flow.

In some embodiments the ram fluid flow inlet port is provided on a wall of the housing facing into the main direction of the ram fluid flow. Thus, the ram fluid flow inlet port may for example be provided on a front wall of the housing. The front wall may for instance be substantially perpendicular to the top wall and/or adjacent the top wall of the housing optionally comprising the propulsor fluid flow inlet port. In some embodiments the front wall of the housing may be provided by a scoop (where for instance the front wall would otherwise be at least partially aerodynamically occluded from the ram fluid flow (e.g. by an upstream structure such as a wing or another housing of another instance of the system)). In some embodiments the front wall of the housing may be provided by a scoop where the propulsor is a tilt-rotor, and where in at least one particular flight mode, propulsor fluid flow would otherwise be ingested into the ram fluid flow inlet port in combination with the ram fluid flow. Alternatively, the ram fluid flow inlet port may be arranged specifically so that a combination of ram fluid flow and propulsor fluid flow is ingested thereby, in at least one particular flight mode, where the propulsor is a tilt-rotor.

In some embodiments the valve, propulsor fluid flow inlet port and ram fluid flow inlet port are arranged such that any propulsor fluid flow provides a force tending to open the valve and any ram fluid flow provides a force tending to close the valve. Specifically, it may be that the arrangement in terms of the positioning and/or orientation and/or formation of the valve, propulsor fluid flow inlet port and ram fluid flow inlet port is selected to achieve this. By way of example, it may be that the valve comprises a hinged door, with main opposed surfaces (which may for example be substantially flat and/or parallel). The hinge may mount the hinged door (e.g. to the housing) such that where ram fluid flow is entering via the ram fluid flow inlet port, at least part of it is incident towards one of the main opposed surfaces in a direction biasing the valve towards closing (especially for instance where the valve is open). Further, such that where propulsor fluid flow is incident towards the propulsor fluid flow inlet port from outside of the housing, it is incident towards the other main opposed surface in a direction biasing the valve towards opening (especially for instance where the valve is closed). The arranging of the valve, propulsor fluid flow inlet port and ram fluid flow inlet port such that any propulsor fluid flow provides a force tending to open the valve and any ram fluid flow provides a force tending to close the valve, may permit either passive opening and/or closing of the valve and/or requirement for reduced actuation force to open and close the valve as desired. In the case that the propulsor is a tilt-rotor it may be that the valve, propulsor fluid flow inlet port and ram fluid flow inlet port are arranged such that in at least one particular flight mode, a combination of the ram fluid flow and propulsor fluid flow provides a force tending to close the valve. In such circumstances the combination may have been ingested via the ram fluid flow inlet port.

In some embodiments, the system is configured such that the balance of forces on the valve is such that it opens and/or closes passively in dependence on the operation configuration of the system. Thus by way of example, it may be that the biasing is weighted such that the valve opens passively under the influence of a propulsor fluid flow rate above a pre-defined threshold impinging on the valve and in the absence of a ram fluid flow rate above a pre-defined threshold impinging on the valve. Similarly it may be for instance that the biasing is weighted such that the valve closes passively under the influence of the biasing and/or a ram fluid flow rate above a pre-defined threshold impinging on the valve. Such a system may remove the need for powered actuation and therefore reduce power requirements of the system and/or reduce complexity.

In some embodiments the housing comprises an exit port in fluid communication with a second chamber of the housing on a discharge side of the heat exchanger, the exit port being arranged to exhaust fluid that has passed from the first chamber, through the heat exchanger to the second chamber, out of the housing. As will be appreciated, multiple exit ports may be provided and discussion in this document of any individual exit port may be considered to also apply to other exit ports mutatis mutandis.

In some embodiments the exit port is located and arranged to exhaust into a part of the propulsor fluid flow, where present, which is travelling around the housing rather than having been ingested into it. The exit port may for instance exhaust fluid flow in a direction substantially perpendicular to or having a component in the same direction as the main direction of the propulsor fluid flow travelling around the housing. The deflection of the portion of the propulsor fluid flow travelling around the housing may create a reduced static pressure at locations around the housing. Where the exit port is positioned accordingly, the Venturi effect may arise, thus encouraging the flow of a proportion of the propulsor fluid flow through the heat exchanger. An entrainment effect may also encourage flow in a similar manner.

In some embodiments the exit port is located and arranged to exhaust into part of the ram fluid flow, where present, not ingested into the housing but travelling around it. The exit port may for instance exhaust fluid flow in a direction substantially perpendicular to or having a component in the same direction as the main direction of the ram fluid flow travelling around the housing. The deflection of the portion of the ram fluid flow travelling around the housing may create a reduced static pressure at locations around the housing. Where the exit port is positioned accordingly, the Venturi effect may arise, thus encouraging the flow of a proportion of the ram fluid flow through the heat exchanger. An entrainment effect may also encourage flow in a similar manner.

In some embodiments the exit port is provided on a side wall of the housing. The side wall may for instance be substantially perpendicular to the top wall and/or adjacent to the top wall of the housing optionally comprising the propulsor fluid flow inlet port and/or may be substantially perpendicular to the front wall and/or adjacent to the front wall of the housing optionally comprising the ram fluid flow inlet port. It may be that at least one such exit port is provided on each side wall.

In some embodiments the heat exchanger is arranged obliquely within the housing. Such an arrangement may facilitate positioning of the propulsor fluid flow inlet port and ram fluid flow inlet port on one side of the heat exchanger and the exit port on the other. The heat exchanger may provide a separating wall between the first and second chambers. Fluid flow may pass between the first and second chambers through the heat exchanger.

In some embodiments at least part of the drive system is provided within the housing. This may provide for physical and/or aerodynamic shielding of part or all of the drive system.

In some embodiments at least part of the drive system provided within the housing may be located between the heat exchanger and at least one of the exit ports, such that fluid flow exhausted through that exit port passes around and/or through the part of the drive system.

As will be appreciated the housing and relevant part of the drive system may be appropriately packaged to permit fluid flow around and/or through the part of the drive system. This arrangement may give rise to an additional thermal management benefit (fluid flow in thermal contact with the part of the drive system directly). Additionally, such an arrangement may provide for an increased fluid replacement rate in areas surrounding the part of the drive system, which may reduce the risk of fuel (e.g. hydrogen) build-up in the event of a leak.

In some embodiments the system comprises a fuel store for the drive system and the fuel store is located so as to be at least partially aerodynamically shielded from the ram fluid flow by the housing. This may have benefits in terms of aerodynamic performance of the system and/or a flying vehicle on which the system is provided. The fuel store may for instance be a fuel tank.

In some embodiments the system comprises a pylon arranged to mount the propulsor to a flying vehicle. The pylon may be arranged to be mounted to a wing and/or stub wing and/or canard and/or tail plane of the flying vehicle.

In some embodiments the pylon forms at least part of the housing. Integration of the housing and pylon may be efficient in terms of packaging and aerodynamic performance. Additionally, the pylon may provide a suitable location for the housing in terms of position in relation to a propulsor associated with the pylon and/or in terms of desirable locations and orientations for one or more of the ports previously discussed.

In some embodiments the propulsor is disposed to face a top wall of the pylon on which it is mounted. In this way the top wall of the pylon may be subjected to propulsor fluid flow. Where the propulsor is a tilt-rotor, the propulsor may be arranged to face a top wall of the pylon in at least one flight mode.

In some embodiments the propulsor fluid flow inlet port is disposed on the top wall of the pylon. This may be efficient for ingestion of propulsor fluid flow.

In some embodiments the ram fluid flow inlet port is disposed on a front wall of the pylon. This may be efficient for ingestion of ram fluid flow. In some embodiments the front wall of the pylon may be provided by a scoop (where for instance the front wall would otherwise be at least partially aerodynamically occluded from the ram fluid flow (e.g. by an upstream structure such as a wing or another pylon of another instance of the system)). In some embodiments the front wall of the pylon may be provided by a scoop where the propulsor is a tilt-rotor, and where in at least one particular flight mode, propulsor fluid flow would otherwise be ingested into the ram fluid flow inlet port in combination with the ram fluid flow. Alternatively, the ram fluid flow inlet port may be arranged specifically so that a combination of ram fluid flow and propulsor fluid flow is ingested thereby in at least one particular flight mode where the propulsor is a tilt-rotor.

In some embodiments the drive system comprises a fuel cell which is at least partially thermally regulated by the heat exchanger. Fuel cells may be a suitable power source for flying vehicle propulsors to the extent that they can be adequately and efficiently thermally controlled. The fuel cell may be a hydrogen fuel cell.

In some embodiments the propulsor is a propeller, rotor, tilt-rotor or ducted fan.

In some embodiments the heat exchanger is a radiator. Fluid flow passing through fins of the radiator may alter the temperature of (e.g. cool) a heat-transfer fluid running through the radiator as part of a circuit which also includes a heat exchanger in thermal communication with one or more components of the drive system.

In some embodiments no other and/or no dedicated thermal regulation system is provided arranged to thermally regulate the drive system.

According to a second aspect of the invention there is provided a flying vehicle comprising the system of the first aspect. The flying vehicle may comprise multiple such systems.

In some embodiments the flying vehicle is arranged for vertical take-off and/or landing and/or short take-off and/or rolling vertical landing with the propulsor providing at least part of the vertical lift force required. The propulsors of all of the systems provided may provide substantially all of the vertical lift force generatable by the flying vehicle.

In some embodiments the flying vehicle comprises one or more forward thrust system arranged to provide forward thrust for at least one of taxiing, conventional take-off, short take-off or forward flight.

In some embodiments the flying vehicle is an aircraft.

Within the scope of this application it is expressly intended that the various aspects, embodiments, examples and alternatives set out above, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
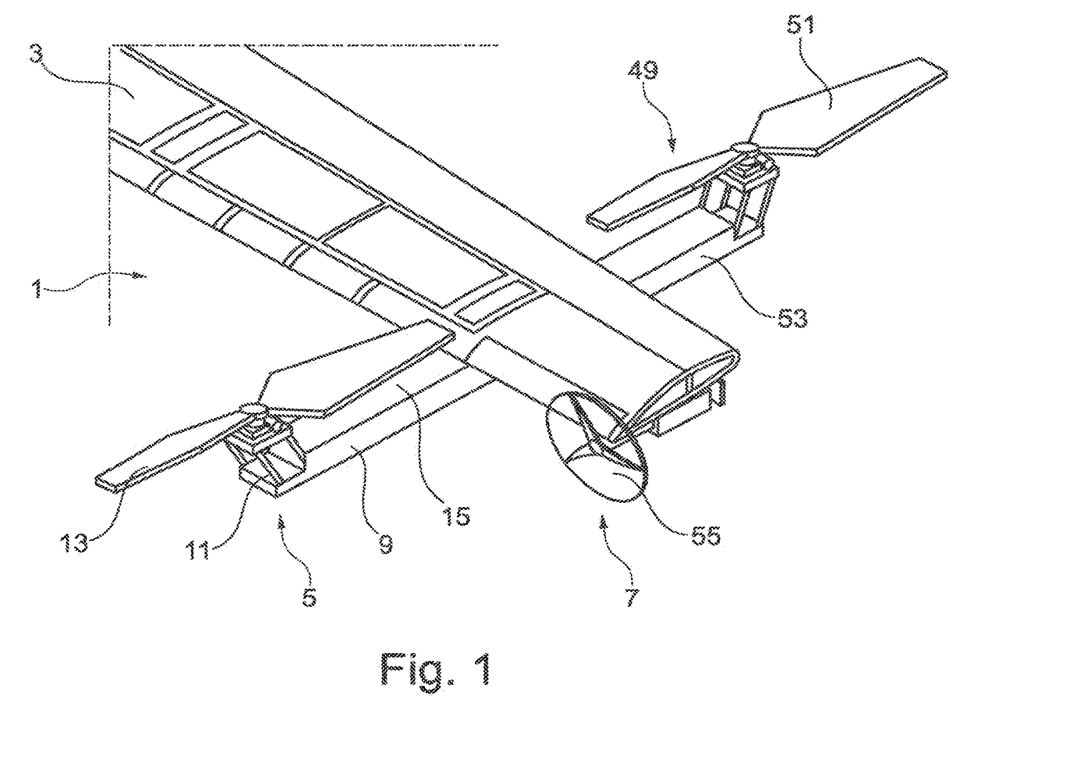
FIG. 1 shows a perspective view of part of flying vehicle according to an embodiment of the invention.
Figure 2:
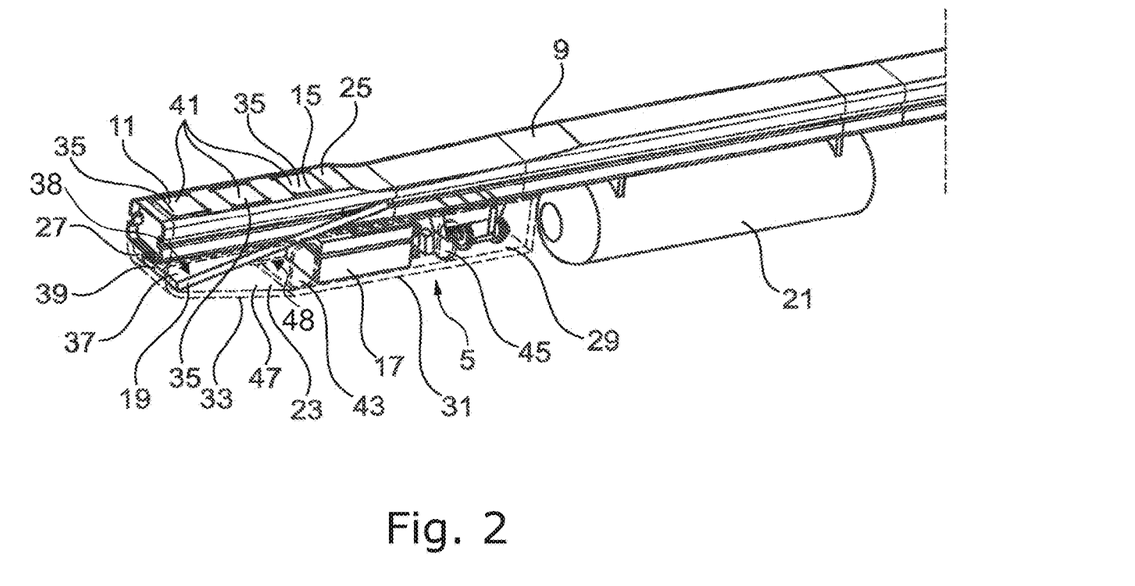
FIG. 2 shows a perspective view of a part of a flying vehicle propulsion system according to an embodiment of the invention.

Referring to FIGS. 1 and 2, a part of a flying vehicle (in this case an aircraft) is generally shown at 1. The flying vehicle 1 has a wing 3 provided on which are a flying vehicle propulsion system generally shown at 5 and a forward thrust system generally shown at 7.

The flying vehicle propulsion system 5 is arranged to provide vertical thrust for the flying vehicle 1, whereas the forward thrust system 7 is arranged to provide forward thrust for the flying vehicle 1.

The flying vehicle propulsion system 5 has a pylon 9 which is mounted to the wing 3 and projects forward therefrom. Mounted at a forward end 11 of the pylon 9, distal to its mount with the wing 3, is a propulsor (in this case a rotor 13). The rotor 13 is disposed above the pylon 9 with a plain of rotation substantially parallel to a top wall 15 of the pylon 9. The rotor 13 is thus disposed to face the top wall 15 of the pylon 9.

Also mounted to the pylon 9 is a drive system (in this case a fuel cell 17). The fuel cell 17 is mounted to an underside of the pylon 9. The fuel cell 17 is arranged to power rotation of the rotor 13.

Also mounted to the underside of the pylon 9 is a heat exchanger (in this case a radiator 19). The radiator 19 is mounted forward of the fuel cell 17 (nearer to the forward end 11 of the pylon 9, and in this case substantially at the forward end 11 of the pylon 9). The radiator 19 comprises part of a fluid circuit (not shown) in thermal communication with ambient fluid surrounding fins (not shown) of the radiator 19. The fins increase surface area and promote thermal communication between a heat-transfer fluid (provided in the fluid circuit in use) and the ambient fluid. As the heat-transfer fluid is pumped around the fluid circuit by a pump thereof, (not shown) it is also in thermal communication with a further heat exchanger, which is itself also in thermal communication with the fuel cell 17. As will be appreciated various options are possible with regard to the particular design of the further heat exchanger and its interface with the fuel cell 17 (it could be for instance that the further heat exchanger forms part or all of an outer casing of the fuel cell 17 and/or that the further heat exchanger forms one or more plates within a stack of plates of the fuel cell 17).

Also mounted to the underside of the pylon 9 is a fuel tank 21. The fuel tank 21 is mounted aft of the fuel cell 17 (nearer to the mount of the pylon 9 with the wing 3). The fuel tank 21 is arranged in use to contain fuel for the fuel cell (e.g. hydrogen in the case of a hydrogen fuel cell) for delivery to the fuel cell 17 as required.

The radiator 19 and fuel cell 17 are provided within a housing 23. A top wall 25 of the housing 23 is provided by the pylon 9. The remainder of the housing 23, including a front wall 27, side walls 29 and bottom wall 31 are provided by a shroud suspended below the pylon 9. The housing 23 is substantially rectangular in cross-section with a forward portion 33 which tapers down towards the front wall 27. The housing 23 provides a fluid tight container with the exception of various ports discussed further below. The radiator 19 is planer in form and arranged obliquely within the housing 23. The radiator 19 meets the housing 23 around its entire perimeter, creating a seal at the interface. A first side of the radiator 19 is located proximate an interface between the front 27 and bottom 31 walls. Second and third walls of the radiator 19 are respectively located against opposite side walls 29. A fourth wall of the radiator 19 is located against the top wall 25.

The housing 23 has three propulsor fluid flow inlet ports 35 on the top wall 25 of the housing 23. The propulsor fluid flow inlet ports 35 face the rotor 13 which is disposed above the top wall 25. The propulsor fluid flow inlet ports 35 are positioned forward of the interface between the fourth wall of the radiator 19 and the top wall 25 (that is nearer to the forward end 11). The propulsor fluid flow inlet ports 35 allow fluid communication between the inside and outside of the housing 23 and in particular provide fluid communication with a first chamber 37 inside of the housing 23 on an inlet side 38 of the radiator 19. Also providing fluid communication between outside the housing 23 and the first chamber 37 is a ram fluid flow inlet port 39 on the front wall 27 of the housing 23.

Each of the propulsor fluid flow inlet ports 35 has a valve 41 arranged to close the respective propulsor fluid flow inlet port 35 when the valve 41 is closed and open the propulsor fluid flow inlet port 35 when the valve 41 is open. Each valve 41 takes the form of a door hinged along its side nearest to the forward end 11, with the door opening into the housing 23. Each valve is sprung loaded so as to be biased closed.

Also providing fluid communication between outside the housing 23 and the inside of the housing 23 are fore 43 and aft 45 exit ports, one in each pair being provided on a respective one of the side walls 29. The exit ports 43, 45 provide fluid communication between outside of the housing 23 and a second chamber 47 inside of the housing 23 on a discharge side 48 of the radiator 19. The radiator 19 provides a separating wall between the first 37 and second 47 chambers, though fluid can pass between the chambers 37, 47 through the radiator 19 as heat exchange occurs. The second chamber 47 also contains the fuel cell 17 positioned further from the forward end 11 than the fore exit ports 43 and nearer to the forward end 11 than the aft exit ports 45.

As can be seen in FIG. 1, the flying vehicle 1 has an additional pylon and rotor arrangement generally shown at 49. A rotor 51 of the additional pylon and rotor arrangement 49 is arranged to provide vertical thrust for the flying vehicle 1 in a similar manner to the rotor 13 of the flying vehicle propulsion system 5, but in this embodiment is powered by the fuel cell 17 of the flying vehicle propulsion system 5. A pylon 53 of the additional pylon and rotor arrangement 49 is mounted to and extends rearwards from the wing 3 in a substantially symmetric fashion with the pylon 9.

As will be appreciated, in other embodiments, the additional pylon and rotor arrangement may have its own fuel cell 17 and radiator 19 and be commensurate with and optionally independent of the flying vehicle propulsion system 5.

The forward thrust system 7 is arranged to provide forward thrust for the flying vehicle 1. The forward thrust system 7 is mounted to the wing 3 proximate its wingtip, The forward thrust system 7 comprises a rotor 55 which is powered by the fuel cell 17. In other embodiments however the rotor 55 may be provided with its own and/or a different drive system.

In use, the fuel cell 17 is arranged to drive the rotors 13, 51 and 55 and the radiator 19 is arranged to thermally regulate the fuel cell 17.

When the aircraft 1 is operated in a manner whereby it is travelling in a forward direction, a ram fluid flow having a main direction opposite to the direction of forward motion will be generated. When the rotor 13 is operating, a propulsor fluid flow having a main direction perpendicular to the plane of rotation of the rotor 13 and towards the pylon 9 is generated. The main directions of the ram fluid flow and the propulsor fluid flow are therefore different, and indeed are perpendicular. Consequently, if sufficiently ingested, each respective fluid flow has the potential to compensate for the loss of the other in providing thermal regulation for the fuel cell 17 as aircraft 1 operation changes.

As will be appreciated the aircraft 1 can be operated so as to have varying forward velocities as powered at least in part by the forward thrust system 7. Ram fluid flow will be ingested into the first chamber 37 via the ram fluid flow inlet port 39 on the front wall 27 of the housing 23 and impinge on the radiator 19. This is because the front wall 27 of the housing 23 faces into the main direction of the ram fluid flow. Where the aircraft 1 is operated in a manner such that the ram fluid flow has at least a velocity predetermined to be sufficient for thermally regulating the fuel cell 17, the force of that ram fluid flow in combination with the biasing of the valves 41 is greater than any force produced by the propulsor fluid flow, and thus the valves 41 are closed. In this manner, ram fluid flow tends not to escape from the housing 23 through the propulsor fluid flow inlet ports 35. Consequently, ram fluid flow entering the housing 23 tends to pass through the radiator 19 from the first chamber 37 to the second chamber 47. In doing so it provides thermal regulation to the heat-transfer fluid running through the radiator 19, and thereby, via the circuit and heat exchanger, to the fuel cell 17. After entering the second chamber 47, the ram fluid flow exits the housing via the fore 43 and aft 45 exit ports. Ram fluid flow exiting via the aft 45 exit ports also passes directly over the fuel cell 17 and thereby provides an additional degree of thermal regulation. As the ram fluid flow exits the fore 43 and aft 45 exit ports, it passes into ram fluid flow passing around the housing 23. Consequently ram fluid flow is encouraged to flow through the housing 23 by the Venturi effect and entrainment.

Thus, when forward velocity is sufficient, the fuel cell 17 is thermally regulated without the requirement for alternative thermal regulation equipment. Where thermal regulation is provided by ram fluid flow in this manner, the flying vehicle propulsion system is considered to be operating in a second operation configuration. Operation in this configuration may for instance arise during at least one of conventional take-off or forward flight operation of the aircraft 1.

When travelling in the forward direction, the housing 23 also provides a degree of aerodynamic shielding from the ram fluid flow to the fuel tank 21.

As will be appreciated, the aircraft 1 can be operated with the rotor 13 running in order to produce a vertical thrust. In such cases, the rotor 13 produces a propulsor fluid flow with the downstream wash directed towards the pylon 9 and housing 23. Where the valves 41 are open, part of the propulsor fluid flow will be ingested into the first chamber 37 via the propulsor fluid flow inlet ports 35 on the top wall 25 of the housing 23 and impinge on the radiator 19. This is because the top wall 25 of the housing 23 faces into the main direction of the propulsor fluid flow. Where the aircraft 1 is operated in a manner such that the propulsor fluid flow has a velocity sufficient to overcome the biasing force on the valves 41 and the force created by any ram fluid flow, the valves 41 will open. Thereafter, propulsor fluid flow entering the housing 23 tends to pass through the radiator 19 from the first chamber 37 to the second chamber 47. In doing so, it provides thermal regulation to the heat-transfer fluid running through the radiator 19, and thereby, via the circuit and heat exchanger, to the fuel cell 17. After entering the second chamber 47, the tapering of the forward portion 33 tends to turn the propulsor fluid flow towards the fore 43 and aft 45 exit ports, through which it exits the housing 23. Propulsor fluid flow exiting via the aft 45 exit ports also passes directly over the fuel cell 17 and thereby provides an additional degree of thermal regulation. As the propulsor fluid flow exits the fore 43 and aft 45 exit ports, it passes into propulsor fluid flow passing around the housing 23. Consequently propulsor fluid flow is encouraged to flow through the housing 23 by the Venturi effect and entrainment.

Thus, when forward velocity is insufficient and the rotor 13 is running, the loss in thermal regulation that would otherwise have been provided by the ram fluid flow may be compensated for by the propulsor fluid flow. In this way the fuel cell 17 may continue to be thermally regulated without the requirement for alternative thermal regulation equipment. Where thermal regulation is provided by propulsor fluid flow in this manner, the flying vehicle propulsion system is considered to be operating in a first operation configuration. Operation in this configuration may for instance arise during at least one of static, taxiing, vertical take-off, short take-off, vertical flight, vertical landing or rolling vertical landing operation of the aircraft 1. The rotor 13 may be deactivated in forward motion such as cruise flight and/or fast taxiing/conventional take-off.

The fuel cell 17, thermally regulated as described above, additionally provides power for operation of the rotors 51 and 55 as desired/required.

In alternative embodiments where the rotor 51 is independently powered, the additional pylon and rotor arrangement 49 may be adjusted as appropriate by comparison with the description of the flying vehicle propulsion system 5 in order to allow ingestion of the relevant fluid flows. For instance, ingestion of the ram fluid flow may be facilitated by a ram fluid flow inlet port comprising a scooped portion of the housing.

As will be appreciated the fluid forming the ram fluid flow and/or propulsor fluid flow may be air or other liquids and/or gases encountered in the ambient environment and/or exhausted by flying vehicle propulsion system 5 and/or exhausted by other aircraft 1 systems.

As will be appreciated, the embodiment of FIGS. 1 and 2 has a rotor 13 that has a fixed mounting orientation with respect to the flying vehicle 1. Nonetheless, in other embodiments, the rotor may be a tilt-rotor, allowing for instance approximately 90 degree angular adjustment to give substantially different (e.g. substantially perpendicular) propulsor fluid flows in different flight modes. In this case, when the flying vehicle propulsion system is in the second configuration, it may be that it ingests one, other or a combination of both ram fluid flow and propulsor fluid flow into the ram fluid flow inlet port, and any such fluid so ingested may be incident on the heat exchanger and may provide thermal regulation. Alternatively, the flying vehicle propulsion system may be arranged such that even where the propulsor is a tilt rotor, ingestion of propulsor fluid flow into the ram fluid flow inlet port is substantially avoided regardless of flight mode. This might for instance be achieved with one or more scoops allowing positioning of the ram fluid flow inlet port in a manner so as to limit or prevent the ingestion of propulsor fluid flow.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A flying vehicle propulsion system comprising:
a propulsor, a drive system and a heat exchanger, wherein the drive system is arranged to drive the propulsor and the heat exchanger is arranged to thermally regulate at least part of the drive system, the propulsor being arranged to move fluid, thereby producing a propulsor fluid flow having a main direction, and wherein:
the flying vehicle propulsion system is arranged such that in a first operation configuration, at least part of the propulsor fluid flow is incident on the heat exchanger, thereby thermally regulating the at least part of the drive system;
the flying vehicle propulsion system further comprises a housing in which the heat exchanger is provided;
the housing comprises a propulsor fluid flow inlet port in fluid communication with a first chamber of the housing on an inlet side of the heat exchanger, the propulsor fluid flow inlet port being arranged to receive the propulsor fluid flow for ingestion into the first chamber and heat exchanger;
the propulsor fluid flow inlet port comprises a valve arranged to close the propulsor fluid flow inlet port when the valve is closed and open the propulsor fluid flow inlet port when the valve is open; and
the valve is biased such that at least one of:
the valve opens passively under an influence of a propulsor fluid flow rate of the propulsor fluid flow above a pre-defined threshold impinging on the valve; and
the valve closes passively under an influence of a biasing force.

2. The flying vehicle propulsion system according to claim 1, wherein in a second operation configuration, the propulsion system is arranged such that a ram fluid flow produced by forward flight of a flying vehicle equipped with the propulsion system, is incident on the heat exchanger, thereby thermally regulating the at least part of the drive system.

3. The flying vehicle propulsion system according to claim 2, wherein the main direction of the propulsor fluid flow is different from a main direction of the ram fluid flow.

4. The flying vehicle propulsion system according to claim 3, wherein the main direction of the propulsor fluid flow is substantially perpendicular to the main direction of the ram fluid flow.

5. The flying vehicle propulsion system according to claim 2, wherein the first operation configuration is a configuration in which the ram fluid flow is not present or has a velocity below a predetermined threshold.

6. The flying vehicle propulsion system according to claim 1, wherein the housing comprises a ram fluid flow inlet port in fluid communication with the first chamber of the housing on the inlet side of the heat exchanger, the ram fluid flow inlet port being arranged to receive ram fluid flow for ingestion into the first chamber and heat exchanger.

7. The flying vehicle propulsion system according to claim 6, wherein the valve, the propulsor fluid flow inlet port and the ram fluid flow inlet port are arranged such that the propulsor fluid flow provides a force tending to open the valve and the ram fluid flow provides a force tending to close the valve.

8. The flying vehicle propulsion system according with claim 1, wherein the housing comprises an exit port in fluid communication with a second chamber of the housing on a discharge side of the heat exchanger, the exit port being arranged to exhaust fluid that has passed from the first chamber, through the heat exchanger to the second chamber, out of the housing.

9. The flying vehicle propulsion system according to claim 8, wherein the exit port is provided on a side wall of the housing.

10. The flying vehicle propulsion system according to claim 1, wherein the heat exchanger is arranged obliquely within the housing.

11. The flying vehicle propulsion system according to claim 1, wherein at least part of the drive system is provided within the housing.

12. The flying vehicle propulsion system according to claim 1, further comprising a pylon arranged to mount the propulsor to a flying vehicle.

13. The flying vehicle propulsion system according to claim 1, wherein the drive system comprises a fuel cell which is at least partially thermally regulated by the heat exchanger.

14. The flying vehicle propulsion system according to claim 1, wherein the propulsor is a propeller, rotor, tilt-rotor ducted fan.

15. The flying vehicle propulsion system according to claim 1, wherein the heat exchanger is a radiator.

16. A flying vehicle comprising the flying vehicle propulsion system of claim 1.

17. The flying vehicle according to claim 16, wherein the flying vehicle is arranged for vertical take-off and/or landing and/or short take-off and/or rolling vertical landing with the propulsor providing at least part of the vertical lift force required.

18. The flying vehicle according to claim 16, wherein the flying vehicle comprises one or more forward thrust system arranged to provide forward thrust for at least one of taxiing, conventional take-off, short take-off or forward flight.

* * * * *